United States Patent [19]

Kolic

[11] 4,025,015

[45] May 24, 1977

[54] DETACHABLE ARTICLE-MOUNTING DEVICE

[76] Inventor: Edwin S. Kolic, 544 Knights Ave., Gahanna, Ohio 43230

[22] Filed: Aug. 6, 1975

[21] Appl. No.: 602,447

[52] U.S. Cl. .......................... 248/205 A; 24/73 AP; 248/224.4
[51] Int. Cl.² .................... F16M 11/32; H02G 3/26
[58] Field of Search ............. 248/205 A, 223, 224, 248/225, 73, 74 A, 74 R, 74 PB, 316 D; 24/73 AP, 81 CC

[56] References Cited

UNITED STATES PATENTS

| | | | |
|---|---|---|---|
| 1,518,943 | 12/1924 | Story | 24/73 VA UX |
| 3,592,428 | 7/1971 | McFarlane | 248/74 PB |
| 3,666,225 | 5/1972 | Weinberger | 248/205 A |
| 3,786,982 | 1/1974 | Rakes | 24/208 A |
| 3,809,799 | 5/1974 | Taylor | 248/316 D |

OTHER PUBLICATIONS

T884,011, Mar. 3, 1971, Garner, 24/73 AP.

Primary Examiner—J. Franklin Foss
Attorney, Agent, or Firm—Hopgood, Calimafde, Kalil, Blaustein & Lieberman

[57] ABSTRACT

The invention contemplates a mounting device comprising first and second adapters having separable plug-and-socket engagement to each other; one of the adapters includes means for mounting the same to a relatively fixed surface, and the other adapter includes means for mounting the same to an article to be removably supported by the relatively fixed surface. The first adapter has a self-sticking adhesive layer on its bottom surface, accessible upon removal of a protective peel-off sheet; the other adapter may be one of several described varieties, depending upon particular usage. Various usages and embodiments are described.

15 Claims, 11 Drawing Figures

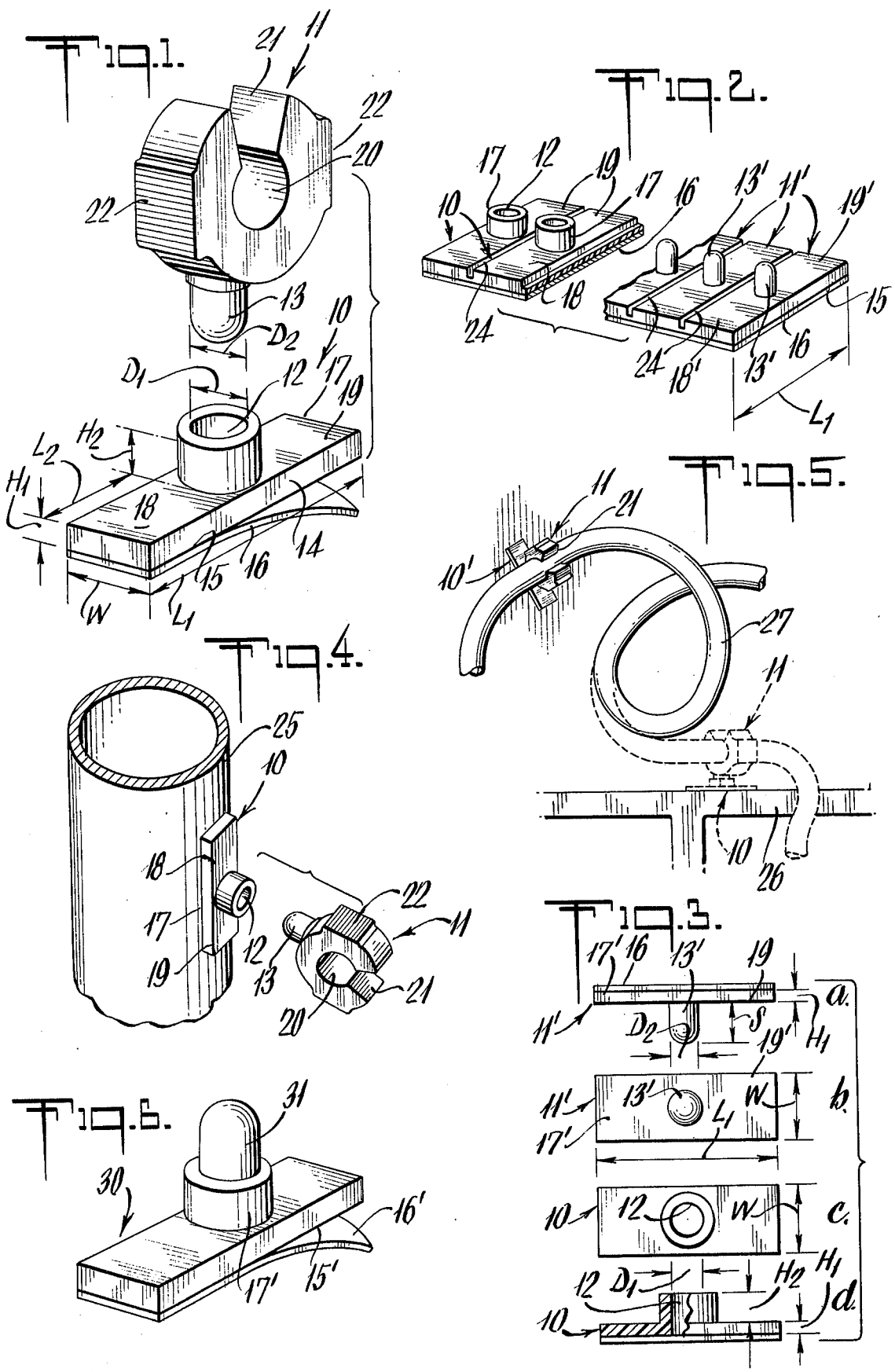

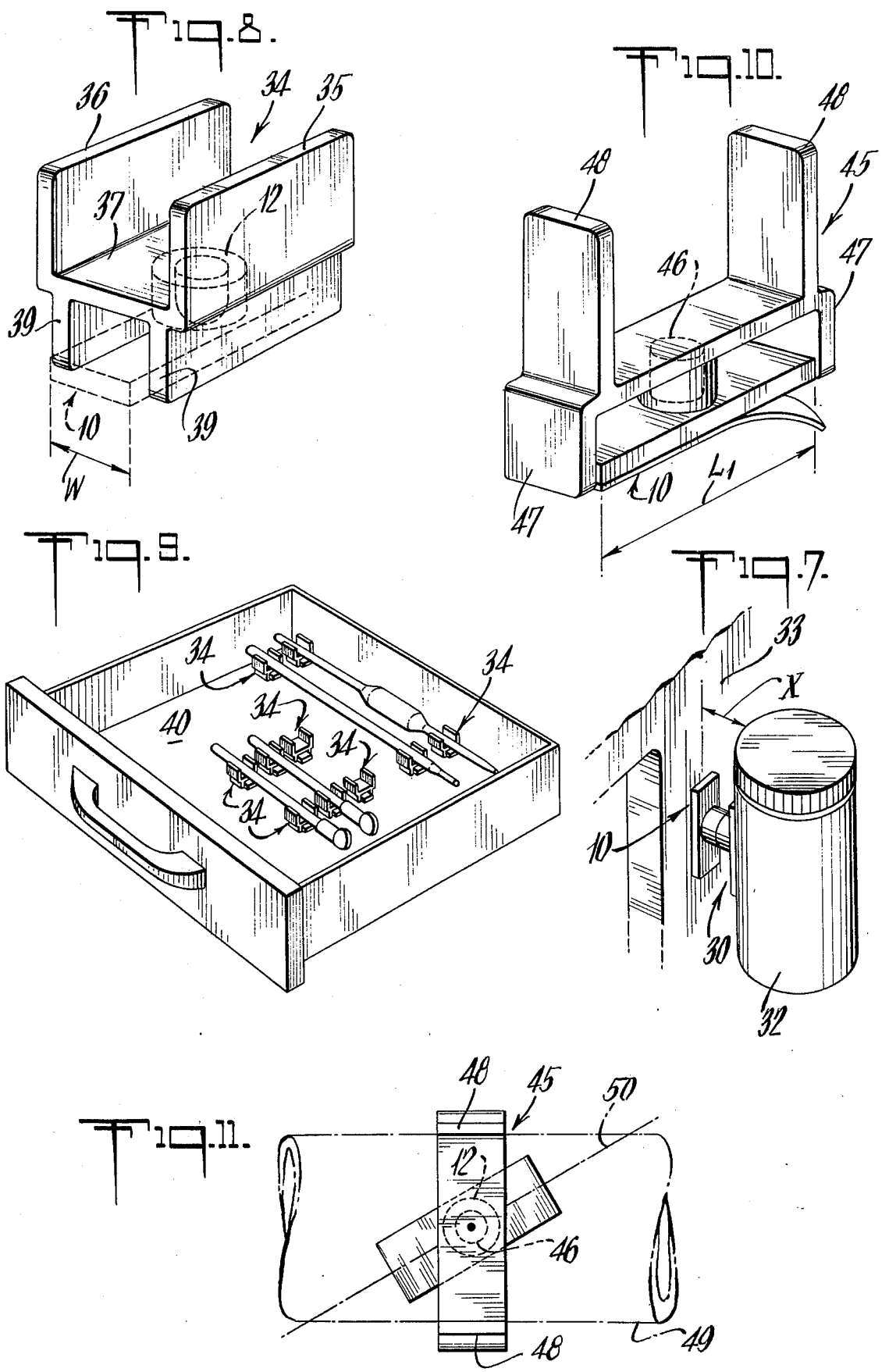

DETACHABLE ARTICLE-MOUNTING DEVICE

The invention relates to means for the removable mounting of a relatively light-weight article to an existing relatively fixed reference surface, as for example, for the removable mounting of flexible tubing to a bed frame or wall.

It is an object of the invention to provide improved means of the character indicated.

Another object is to provide such means without involving any modification or damage to the reference surface or to the article to be removably mounted.

A further object is to provide such a device which will be selectively applicable to a wide range of flat and curved reference surfaces.

It is also an object to achieve the above objects with a construction involving separably connected reference-surface mounted and article-engaging elements, and in which the reference-surface mounted element inherently retains its fidelity of adherence to the reference surface, regardless of the number of times that an article-engaging element is engaged thereto.

It is a general object to meet the above objects with simple, reliable, fool-proof and inexpensive structure.

Other objects and various further features of novelty and invention will be pointed out or will occur to those skilled in the art, from a reading of the following specification in conjunction with the accompanying drawings. In said drawings, which show, for illustrative purposes only, preferred forms of the invention:

FIG. 1 is an exploded view in perspective showing separable elements of a mounting device of the invention;

FIG. 2 is a perspective view, partly broken-away and in section, to show the preferred manufacturing and marketable form of plural reference-mounting elements, some of which are of a type shown in FIG. 1;

FIG. 3 is a succession of views, labeled a, b, c, d, and respectively showing side and plan views of a plug element, and plan and side views of a socket element, in the construction of FIG. 2;

FIGS. 4 and 5 are simplified fragmentary perspective views to show representative reference-mounting orientations, for the device of FIG. 1;

FIG. 6 is a perspective view of an alternative article-engaging element, for use with the reference-surface mounting element of FIG. 1;

FIG. 7 is a fragmentary perspective view to illustrate a use of the component element of FIG. 6;

FIG. 8 is a perspective view of another alternative article-engaging device, for use with the reference-surface mounting element of FIG. 1;

FIG. 9 is a perspective view to illustrate plural use of the component element of FIG. 8;

FIG. 10 is a perspective view of a further alternative article-engaging device, for use with the reference-surface mounting element of FIG. 1; and FIG. 11 is a plan view of the article-engaging device of FIG. 10, to illustrate a mounted application thereof.

In FIG. 1, the mounting device of the invention is seen to comprise separably engageable first and second mounting adapter elements 10-11. The separable engagement involves plug-and-socket interference fit of mating formations 12-13 on the respective elements. The first or socket element 10 has a body 14 with a cylindrical bore is upwardly open and which is closed at its lower end; body 14 is preferably a single injection-molded plastic article, of resiliently deformable material such as polyethylene or polypropylene, being shown with an elongate flat rectangular smooth and imperforate bottom surface of length $L_1$ and width W for adhesive mounting to a mounting surface. Adhesive mounting utilizes an adhesive layer 15 such as a double-coated pressure-sensitive tape, present preference being indicated for the variety in which the tape body is thin elastomeric foam, for example, the variety designated Scotch Mount Y-4292, being a product of Minnesota Mining and Manufacturing Company; a peeloff strip 16 protects the adhesive bottom surface layer 15. Rising from the longitudinal center of the bottom is a projection 17 which is cylindrically prismatic and of diameter substantially equal to the width W; said diameter is preferably at least no greater than one third of the overall length $L_1$, thus defining relatively thin pliable foot extensions 18–19 of length $L_2$ and coextensive with limits of the bottom layer and strip 15–16.

The other or article-engaging element 11 is generally C-shaped, with an inner cylindrically arcuate surface 20 sized to engage a particular flexible-tube size, for example of ⅛ inch, 3/16 inch, ¼ inch, or larger diameter. A mouth region 21 provides radial insertion access, for assembly of the tubing to surface 20, the latter surface being of greater than 180° extent (as shown), for inherent retention of tube assembly thereto. The outer contour of the body of element 11 is characterized by opposed flats 22 (for finger grasp) and by the mating formation 13 by which plug-and-socket engagement is established. The formations 12–13 are of corresponding sectional configuration, being designed for interference fit, so that upon plug-socket insertion at least some of the air that is compressed in the course of the insertion is also released through transient resilient bulging deformation of the socket formation. Thus, upon assembly of the adapter elements 10–11 to each other, the assembly tends to be retained not only by the limited friction of the interference fit of corresponding sectional contours (in the form shown, both cylindrical, at 12–13) but also by the fact that, by reason of released air, any attempted disassembly must be against a partial-vacuum condition in the socket cavity.

As with element 10, the element 11 may also be a single plastic injection-molded part, of resiliently deformable material, such as polyethylene or polypropylene, and for smoothness of entry into the socket, the end contour of formation 13 is preferably generally hemispherical.

In a typical construction of the parts 10–11, using the indicated materials and for supporting flexible tubing of 3/16-inch diameter, the mating interference-fit sections of formations 12–13 may be of ⅛-inch nominal diameter, the interference arising from the plug diameter $D_2$ at 13 exceeding the socket diameter $D_1$ by 0.002 to 0.01 inch; and the projecting extent of formation 13 is at least no greater than the depth of the socket bore 12. Related further dimensions for the indicated case are:

W = ⅜ inch
$L_1$ = 1.0 inch
$L_2$ = ⅜ inch
$H_1$ = 1/16 inch
$H_2$ = 3/16 inch.

FIG. 2 illustrates at its left end the preferred marketable form for plural elements 10, the same being injection-molded as an elongate strip of successive separable individual elements 10. For the indicated example, a 1/32-inch separation suffices between adjacent bases or feet 18–19, and an elongate groove 24 between each adjacent pair of elements 10 runs the full $L_1$ extent to facilitate simple cut off, as by using ordinary scissors. The adhesive layer 15 (and its projective peel-off sheet 16) will be understood to run the full smooth extent of all bottom surfaces in the strip of FIG. 2, said layer 15 and sheet 16 being also cut upon severance at 24.

FIG. 2 also serves to illustrate a further embodiment wherein self-adhesive and individually severable plug members 11' are formed with integral plug projections 13' in the manner described for the strip of socket members 10, and preferably involving the same injection-molding operation, there being equal pluralities of each of the members 10–11' in each molding operation. Preferably also, the adhesive and protective layers 15–16 are applied in common across the bottom surface of the entire molded product of FIG. 2. Preferred proportions of each pair of the severed adapters of FIG. 2 will appear from the succession of views a, b, c, and d forming parts of FIG. 3, and for the illustrative base dimensions listed above for adapter 10, I prefer to employ a plug and socket interference fit 12–13' based on a socket diameter $D_1$ of 3/16 inch, the projecting span S of plug 13' being approximately the depth of the socket bore 12, i.e., substantially 7/32 inch.

It will be understood that pairs of severed adapters 10–11' may serve for a wide variety of detachable mounting purposes. For example, by first adhering two or more spaced plug elements 11' to the back upper region of a picture frame, or of a panel or otherwise mounted picture, and by then assembling plug adapters 10 to the thus-mounted adapters 11', the picture may be directly and correctly mounted to a wall, upon removal of the peel-off strip 16 from the adapters 10. The adapters 10 then remain correctly affixed to the wall, and the picture (with its adhered adapters 11') may be removably affixed to the wall, via the mating interference fits at 12–13', as often as desired.

FIGS. 4 and 5 illustrate specific applications of the device of FIG. 1. In FIG. 4, a vertical rod 25 such as part of an end frame of a hospital bed or bedside stand, is seen to support an upright longitudinal orientation of element 10. In FIG. 5, an element 10 is horizontally adhered to a rail 26 of a bed, while a further such element 10' is adhered to an adjacent wall of the room. Solid outlines for flexible tubing 27 illustrate that the same element 11 may be selectively applied to the wall element 10' (for convenient storage off the bed) or to the bed (dashed outlines of tubing and for element 11).

FIG. 6 illustrates an alternative article-engaging plug element 30 for selective assembly to a reference-mounting unit as described at 10. The body structure may in all respects match that of element 10, except for the provision of a projecting plug formation 31 at the top of a body pedestal 17' for interference-fit with socket formation 12. Again, an adhesive layer 15' and its peel-off protection sheet 16' cover the full extent of the bottom surface. In use, as to support a pill bottle 32 (FIG. 7), the bottom adhesive 15' is applied longitudinally along part of bottle 32, and the reference-mounting element 10 is adhered to a flat vertical surface, such as a wall 33 of a medicine chest. The bottle is simply grasped for removal, to separate the plug-and-socket relation between elements 10–30, and the bottle is thereafter restored to mounted position, upon plug-and-socket re-engagement. The use of the body pedestal 17' will be seen to have provided, with the effective height $H_2$ of socket 17, an article offset X from wall 33, to an extent more convenient for finger-grasp of bottle 32.

The article-engaging element 34 of FIG. 8 may be more accurately described as U-shaped or as a channel, comprising spaced upstanding side walls 35–36 rising from a base 37, the underside of which is integrally formed with a cylindrical plug projection 38 to removably engage the socket formation 12 in element 10. Spaced foot projections 39 on opposite sides of the insertion axis of formations 38–12 are of extent to sustain channel load, via foot projections 39, directly to the mounting reference surface; as shown, projections 39 are spaced slightly in excess of the width dimension of element 10. In use, a plurality of suitably deployed elements of FIG. 8 in a drawer bottom 40 may establish a sorted array of delicate articles, such as the pipettes, burettes and other glass laboratory instruments shown in FIG. 9.

FIGS. 10 and 11 show a further alternative, similar to FIG. 8, but wherein the article-holding element 45 is fully pivotable about its removable connection 46 to the reference-mounting element 10, and wherein stabilizing feet 47 are spaced in excess of the $L_1$ dimension. Specifically, the integral upstanding side arms 48 are spaced to receive and guide a fishing rod, suggested by phantom broken outline 49 in FIG. 11. In such application, the reference-mounting element may be adhered to part of a boat, such as the gunwale or to a tackle box or hatch, the local directional orientation of a gunwale being suggested by the heavy phantom alignment 50 in FIG. 11. In the fishing-rod application, the plug and socket formations 12–46 are cylindrical. Pivoting is smooth in spite of such interference, due to self-lubrication properties of the polyethylene, polypropylene or like plastic material from which body parts of 10 and 45 are fabricated. This enables easy repositioning of the rod tip (through swivel action at 46-12), as needed to adapt to wind and current conditions, or to enable one to track a fish with a rod tip, should the fish pick up and carry the bait.

It will be seen that the described embodiments of the invention meet all stated objects. The mounting element 10 can be considered as basic, serving a variety of adapter-element purposes exemplified by the various described arrangements. And for the removable mounting of straight or flat articles to each other or to a wall, the article of FIG. 2 is admirably suited, in that a single molding operation suffices for a plurality of pairs of mountable adapter elements 10–11'.

While the invention has been described in detail for the preferred forms shown, it will be understood that modifications may be made without departing from the invention. For example, certain molded-plastic articles such as a picture frame may be molded so as to integrally include one or more plug projections 13, each adaptable to an adhesively backed wall-mounting element 10; such a product enables immediate wall mounting and preserves the removability of the frame.

What is claimed is:

1. Mounting means, comprising first and second adapters having plug-and-socket removable telescoping relatively smoothly cylindrical interference-fit friction engagement to each other, one of said adapters including means for mounting to a relatively fixed surface and the other of said adapters including means for mounting to an article to be remotely and removably supported with respect to the relatively fixed surface;

said one adapter comprising a single unitary injection-molded plastic body of resiliently deformable material, said body having a continuous and imperforate elongate flat bottom of generally rectangular planiform, with an integral centrally located upstanding projection having an upwardly accessible formation for selective establishment of such plug-and-socket engagement, the remainder of said body being relatively thin and pliable in its extension both sides of said projection and coextensively with said bottom, the maximum effective width of said projection being at least no greater than one third the elongate extent of said bottom so that the pliable extensions of said bottom beyond said projection are each at least one third of said elongate extent, a self-sticking adhesive layer covering said bottom, and a protective strip of disposable sheet material peelably retained by the otherwise exposed surface of said adhesive layer, whereby the pliable extensions provide a substantial preponderance of adhesive-area contact as compared with the sectional area of plug-and-socket interfit, and further whereby said pliable extensions materially aid in the adaptability of the adhesive bottom surface to a variety of mounting-surface contours.

2. Mounting means according to claim 1, in which the width of said projection substantially matches that of said bottom, and in which said upwardly accessible formation is an upwardly open cylindrical bore on the axis of said projection and closed by said imperforate bottom.

3. Mounting means according to claim 1, in which the upwardly accessible formation of said projection defines an upwardly projecting plug element, of diameter less than the width dimension of said rectangular planiform.

4. Mounting means according to claim 3, in which the upper end of said formation is generally hemispherical.

5. Mounting means according to claim 1, in which the other of said adapters is a single unitary injection-molded plastic article-engaging body of resiliently deformable material, said body being generally C-shaped and defining an inner generally cylindrical arc having a local radial-insertion opening, the outer contours of article-engaging body including a mating cylindrical formation for establishment of the plug-and-socket engagement, such engagement being by telescoped insertion-mating of said formations, said mating formation having an insertion axis which extends generally radially of the axis of said generally cylindrical arc.

6. Mounting means according to claim 5, in which the socket formation is on said one adapter and in which the plug formation is on the other adapter.

7. Mounting means according to claim 6, in which said support feet are spaced from the insertion axis at least sufficient to span the length dimension of said one adapter, whereby upon plug-and-socket engagement said adapters are fully rotatable with respect to each other.

8. Mounting means according to claim 7, in which said support feet extend from said body portion at least to the extent of the vertical height of said projection from the bottom of said one adapter.

9. The article of claim 8, having a local straight groove between said adjacent mounting adapters, said groove being of sufficient depth to facilitate separation of one adapter from its adjacent adapter as by a scissors cut along the groove and through the adhesive layer and protective strip.

10. Mounting means, comprising first and second adapters having plug-and-socket removable friction engagement to each other; one of said adapters including means for mounting to a relatively fixed surface and the other of said adapters including means for mounting to an article to be remotely supported with respect to the relatively fixed surface, said one adapter comprising a single unitary injection-molded plastic body of resiliently deformable material, said body having an elongate flat bottom of generally rectangular planiform, with an integral centrally located upstanding projection having an upwardly accessible formation for selective establishment of such plug-and-socket engagement, the remainder of said body being relatively thin and pliable in its extension both sides of said projection and coextensively with said bottom, a self-sticking adhesive layer covering said bottom, and a protective strip of disposable sheet material peelably retained by the otherwise exposed surface of said adhesive layer; the other of said adapters being a single unitary injection-molded plastic article-engaging body of resiliently deformable material, said body having an elongate base portion with two upstanding article-engaging arms rising from longitudinally spaced parts of one side of said base portion, the other side of said base portion including a mating formation for establishment of the plug-and-socket engagement, such engagement being by insertion mounting of said formations, said mating formation extending on its insertion axis generally in the direction opposite to the upstanding direction of said arms, and longitudinally spaced support feet extending integrally from the other side of said base portion at locations spaced on opposite sides of the insertion axis at least sufficient to span the width dimension of said one adapter.

11. A fishing-rod clip for swivel-retention of a fishing rod with respect to a relatively fixed reference surface such as a boat gunwale, said clip comprising first and second adapters having plug and socket removable swivel connection to each other; one of said adapters including means for mounting to the reference surface and the other adapter having means to locally engage the fishing rod; said one adapter comprising a single unitary injection-molded plastic body having a flat bottom and a central upward projection, said projection having an upwardly accessible cylindrical formation for selective establishment of such plug and socket engagement, a self-sticking adhesive layer covering said bottom, and a protective sheet of disposable material peelably retained by the otherwise-exposed surface of said adhesive layer; the other of said adapters being a single unitary injection-molded plastic element having a base portion with two spaced upstanding rod-engaging arms rising from one side of said base portion, and a cylindrical mounting formation integral with said base portion and projecting in the direction opposite to said arms, said last-mentioned formation being insertably and rotatably matable with the upwardly accessible formation of said one adapter, and support-foot means extending integrally from the other side of said base portion and offset from the insertion axis at least to an extent sufficient to clear the most extensive offset of said one adapter from the insertion axis.

12. Mounting means according to claim 1, in which the upstanding projection has an upwardly open cylindrical socket bore which is closed at its lower end, and in which said other adapter comprises a single unitary injection-molded plastic body of resiliently deformable material, said second-adapter body having an elongate flat bottom of generally rectangular planiform, with an integral centrally located upstanding cylindrical plug projection for selective interference-fit plug-and-socket coaction with the socket bore, the remainder of said second-adapter body being relatively thin and pliable in its extension both sides of said projection and coextensively with said second-adapter bottom, a self-sticking adhesive layer covering said second-adapter bottom, and a protective strip of disposable sheet material peelably retained by the otherwise exposed surface of said last-mentioned adhesive layer.

13. Mounting means according to claim 12, in which first and second adapters have adjacent but severable flat bottoms in side-by-side integrally-formed array, said protective strips being parts of the same single strip extending in common over the bottoms of both said adapters.

14. Mounting means according to claim 13, in which said first adapter and said second adapter are each one of two like pluralities of such adapters having severably connected bottoms in side-by-side integrally-formed array.

15. Mounting means according to claim 1, in which the other of said adapters is a single unitary injection-molded plastic article-engaging body having a base portion with two spaced upstanding arms rising from one side of said base portion to locally engage a fishing rod or the like, said other adapter having a cylindrical mounting formation integral with said base portion and projecting in the direction opposite to said arms and being insertably and rotatably matable with said upstanding projection upon such plug-and-socket engagement.

* * * * *